United States Patent [19]

Stultz

[11] Patent Number: 5,580,102

[45] Date of Patent: Dec. 3, 1996

[54] PIPE SUPPORT AND PIPELINE THEREWITH

[75] Inventor: Jeffrey H. Stultz, Freeport, Tex.

[73] Assignee: The Dow Chemical Company, Midland, Mich.

[21] Appl. No.: 64,530

[22] Filed: May 20, 1993

Related U.S. Application Data

[63] Continuation-in-part of Ser. No. 800,393, Nov. 27, 1991, abandoned.

[51] Int. Cl.$^6$ ............................................. F16L 3/16
[52] U.S. Cl. ............................ 285/61; 285/115; 285/412; 248/49; 248/901
[58] Field of Search ............................ 285/61, 114, 115, 285/368, 366, 412, 423; 248/49, 72, 901, 61, 114, 115, 366, 364; 405/172

[56] References Cited

U.S. PATENT DOCUMENTS

| | | |
|---|---|---|
| 713,974 | 11/1902 | Foreman .......................... 285/61 X |
| 833,426 | 10/1906 | Taube ................................ 285/114 |
| 1,371,981 | 3/1921 | Rose .................................. 285/61 |
| 1,680,499 | 8/1928 | Clark et al. . |
| 1,941,358 | 12/1933 | Longfellow . |
| 2,420,053 | 5/1947 | Muller ............................ 285/114 X |
| 2,712,424 | 7/1955 | Dion ..................................... 248/49 |
| 3,046,938 | 7/1962 | Perkins .......................... 285/114 X |
| 3,252,192 | 5/1966 | Smith . |
| 3,295,548 | 1/1967 | Woods ............................ 285/114 X |
| 3,399,545 | 9/1968 | Anderson et al. ............... 285/61 X |
| 3,475,041 | 10/1969 | Mesko .............................. 285/114 X |
| 3,501,173 | 3/1970 | Petersen et al. ................... 285/114 |
| 3,527,481 | 9/1970 | Lewis ............................... 285/114 |
| 3,819,210 | 6/1974 | Daniel et al. . |
| 3,836,182 | 9/1974 | Miller . |
| 3,930,675 | 1/1976 | Sasse . |
| 3,951,165 | 4/1976 | Seger et al. ..................... 285/114 X |
| 4,019,705 | 4/1977 | Habuda, Sr. et al. ............... 248/72 |
| 4,109,941 | 8/1978 | Wood et al. ..................... 285/114 X |
| 4,142,702 | 3/1979 | Lamboo ........................... 248/49 X |
| 4,336,959 | 6/1982 | Roche ............................... 285/368 |
| 4,492,391 | 1/1985 | Haines . |
| 4,602,810 | 7/1986 | Babb, Jr. et al. . |
| 4,635,970 | 1/1987 | Haines . |
| 4,948,179 | 8/1990 | Kulikowski et al. ............ 285/114 X |
| 4,958,860 | 9/1990 | Akitsu ............................. 285/114 X |
| 5,090,742 | 2/1992 | Cohen et al. . |
| 5,161,828 | 11/1992 | Hynes et al. . |
| 5,211,602 | 5/1993 | Holmgren ...................... 285/114 X |
| 5,263,796 | 11/1993 | de Waal ............................ 405/172 |
| 5,273,321 | 12/1993 | Richter .......................... 285/114 X |

FOREIGN PATENT DOCUMENTS

| | | | |
|---|---|---|---|
| 0268839 | 7/1964 | Australia ............................. 285/114 |
| 10073 | 4/1980 | European Pat. Off. ................. 248/72 |
| 1499461 | 10/1967 | France .................................. 285/114 |
| 1162649 | 2/1964 | Germany ............................... 285/114 |
| 1945323 | 3/1971 | Germany ............................... 284/114 |
| 3406955 | 9/1984 | Germany ................................. 248/72 |
| 6402215 | 11/1964 | Netherlands ......................... 285/114 |
| 0678244 | 8/1979 | U.S.S.R. ................................. 248/49 |
| 222130 | 8/1924 | United Kingdom ................. 285/114 |

OTHER PUBLICATIONS

Miltary Standardization Handbook "Plastics", Nov. 1, 1965 pp. 43–44.
Driscopipe Systems Design (Form 1160–88 A17 ©1988) brochure (hereinafter referred to as "Driscopipe Systems Design 1988").
Driscopipe Systems Design (Form 1785–90 A17 ©1991) (hereinafter referred to as "Descopipe Systems Design 1991").
The Dow Chemical Company, *Texas Operations Wastewater Treatment Plant Dow U.S.A.*, Mar., 1992.
The Driscopipe Systems Design (1988), and *Engineering Characteristics of Driscoopipe*, No. 1159–88A17, both by Phillips Driscopipe, Inc.

*Primary Examiner*—Terry Lee Melius
*Assistant Examiner*—Heather Chun Shackelford

[57] ABSTRACT

The present invention discloses a support system for thermoplastic pipe which includes two sleeves each securable to one of two pipe ends, each encompassing a portion of the pipe and having a connection member spaced apart from the pipe and interconnected between the sleeves. The system minimizes stress on the pipe and fittings associated with thermal expansion and contraction of the pipe.

40 Claims, 10 Drawing Sheets

PIPE SUPPORT AND PIPELINE THEREWITH

Cross Reference To Related Application

This application is a continuation-in-part of design application Ser. No. 800,393, filed Nov. 27, 1991, now abandoned.

Background of the Invention

This invention is directed to pipe supports and pipelines and, in one aspect to a novel support system for thermoplastic piping (e.g. HDPE) which is suitable for use above grade. This system is particularly useful in supporting piping placed in pipe racks or connected to process equipment without causing stress on the equipment or pipe fittings. With such systems design requirements for structural support is reduced.

High density polyethylene (HDPE) and other thermoplastic materials have been formed into piping. Such piping has provided effective solutions to many material handling problems. Typically such piping is used to handle hazardous materials, such as corrosive fluids. Units or lengths of such piping are generally connected with flanges or welding. Overland pipelines often suffer from thermal expansion which causes the pipe to "snake" or "roll" and the pipe fittings to fail at their mitered welds due to over stressing. Thermal expansion in thermoplastic piping is aggravated in above ground piping (i.e. overland pipelines) by the use of plastic additives, such as carbon black, to block the degradation caused by exposure to ultraviolet light. For example, carbon black filled polyethylene piping can expand 0.25 inch (in.) per 100 feet (ft.) of length per each 10° F. rise in temperature. Typically this type of piping is buried underground to control or mitigate the thermal expansion and contraction of pipe due to changes in temperature. *The Driscopipe Systems Design* (1988), and *Engineering Characteristics of Driscopipe*, No. 1159–88A17, both by Philips Driscopipe, Inc., discuss methods used in the industry to control the "snaking" or "rolling" caused by thermal expansion. For above ground piping systems that contact the ground, anchoring the pipe at specific intervals or allowing the pipe to move between two rows of pylons anchored in the ground restricts lateral movement. Above ground systems that are supported in pipe racks or suspended in the air present a more difficult problem since the support system must be able to support the weight of the pipe and materials in the pipe. The support system must also withstand the forces exerted by the piping during expansion and contraction.

Continuous support may be used where support structures can handle the stress caused by expansion and contraction of the pipe and the weight of the continuous support, in the form of an external casing or other suitable method. Continuous support may be suitable for piping less than 12 inches in diameter, but the cost of such a structure is prohibitive for large diameter piping. Another prior art method involves insulating the pipe to maintain it at a relatively constant temperature to avoid expansion or contraction due to changes in ambient temperatures. Continuous support and insulation are expensive and result in higher initial costs and in higher maintenance costs if a leak occurs. If a leak occurs, the support or insulation must be removed in order to find and repair the leak. This is difficult, time consuming and costly.

The problems associated with above ground piping along a linear pipe segment are compounded when a system involves interconnected three dimensional piping and tank systems. The continuous support and insulation techniques mentioned above are not suited for use in such a three dimensional situation, particularly when vertical pipe runs are required. The connecting points that join vertical piping to tanks are severely stressed when the pipe expands or contracts.

Various approaches have been used to keep pipe joints from separating due to internal or external pressures. One approach uses threaded pipe sections (U.S. Pat. No. 1,680,499 assigned to S. R. Dresser Manufacturing). Clamping rings in conjunction with a coupling sleeve have been used to reinforce screwed joints. U.S. Pat. No. 1,941,358 (assigned to The Elk River Concrete Products Co.), utilizes clamping rings connected by wire cables spaced around the pipe as a connecting truss to overcome movement caused by shifting soil. Use of support plates, interlocked to keep them from moving relative to each other is taught by U.S. Pat. No. 3,819,210 (assigned to Johns-Manville Corporation) as a means of overcoming internal thrust forces in a pressurized fluid. U.S. Pat. No. 3,252,192 discloses the use of clamps which grip the wall of the pipe, the clamps connected by screw elements, to position and hold adjacent ends of piping together. U.S. Pat. Nos. 3,863,182 (assigned to Owens-Illinois, Inc.), 4,492,391 (assigned to Star Industries, Inc.), 4,602,810 and 4,635,970, each incorporated herein by reference, also disclose systems which utilize thrust rods and couplings to hold pipe sections together.

U.S. Pat. No. 3,930,675 (assigned to Chemiebau Dr. A. Zieren GmbH & Co.) addresses the expansion or contraction of pipe systems by use of expansion compensators to absorb stresses. Use of this method requires that the compensators be compatible with the materials to be carried in the piping and be able to withstand flexing at the bellows without failing or leaking. Metal is usually used in such applications due to its ability to flex without losing the ability to contain the material in the pipeline. Thermoplastic materials ordinarily used in piping do not have the resilience required to flex and maintain structural integrity.

None of the patents cited above, however, satisfactorily address the problems caused by thermal expansion or contraction of thermoplastic piping and there is generally a strong economic and performance preference for above ground thermoplastic piping, particularly when piping corrosive or toxic fluids.

SUMMARY OF THE INVENTION

The present invention in one embodiment discloses a novel support system for thermoplastic piping which is suitable for use in above grade piping systems. The support system includes a thermoplastic pipe having a first pipe end and a second pipe end, the support system comprising a first sleeve for disposition about the first pipe end, a first securement means for securing the first sleeve to the first pipe end, a second sleeve for disposition about the second pipe end, second securement means for securing the second sleeve to the second pipe end, and connection means for connecting the sleeves together exteriorly of the pipe.

A second aspect of this invention is a support system for a plastic pipe, the pipe having a first pipe end and a second pipe end and each pipe end having a pipe flange, the support system comprising a first sleeve for disposition about the first pipe end, first securement means for securing the first sleeve to the corresponding pipe flange on the first pipe end, a second sleeve for disposition about the second pipe end, second securement means for securing the second sleeve to the corresponding pipe flange on the second pipe end, and connection means for connecting the sleeves together exteriorly of the pipe.

Another embodiment is a support system for a plastic pipe, the pipe having a first pipe end and a second pipe end and each pipe end having a pipe flange, the support system comprising a first sleeve having a pipe flange for disposition about the first pipe end, first securement means for securing the first sleeve flange to the corresponding flange on the first pipe end, a second sleeve having a pipe flange for disposition about the second pipe end, second securement means for securing the second sleeve flange to the corresponding sleeve flange on the second pipe end, and connection means for connecting the sleeves together exteriorly of the pipe.

In another embodiment this invention is a pipeline comprising a first pipe with two ends, a second plastic pipe with two ends, a third pipe with two ends, the three pipes joined together with an end of the first pipe joined to an end of the second pipe, and the other end of the second pipe joined to an end of the third pipe, and a support system for the second pipe, the support system comprising a first sleeve for disposition about a first end of the second pipe, first securement means for securing the first sleeve to the first end of the second pipe, a second sleeve for disposition about a second end of the second pipe, a second sleeve securement means for securing the second sleeve to a second end of the second pipe, and connection means for connecting the sleeves together exteriorly of the pipe.

In another aspect a system according to this invention has longitudinal extended supports with tension members connecting the two sleeves together and tension members connecting each sleeve to grade or to a support structure.

In another embodiment a system according to this invention includes a method of supporting thermoplastic pipe by use of rigid longitudinal supports which does not require the use of tension members between the sleeves or to connect the sleeves to grade.

Certain systems according to this invention eliminate or substantially reduce the stress on tanks and other equipment to which vertical piping is attached. Such systems are relatively inexpensive. Repair of a pipeline is facilitated by easy access to thermoplastic pipe. Replacement of a segment is also facilitated by using a system according to this invention. Additional objects, features and advantages will be apparent in the written description which follows.

DETAILED DESCRIPTION OF THE INVENTION

Certain presently preferred embodiments of this invention may be more fully understood by reference to the drawings.

Figure 1:
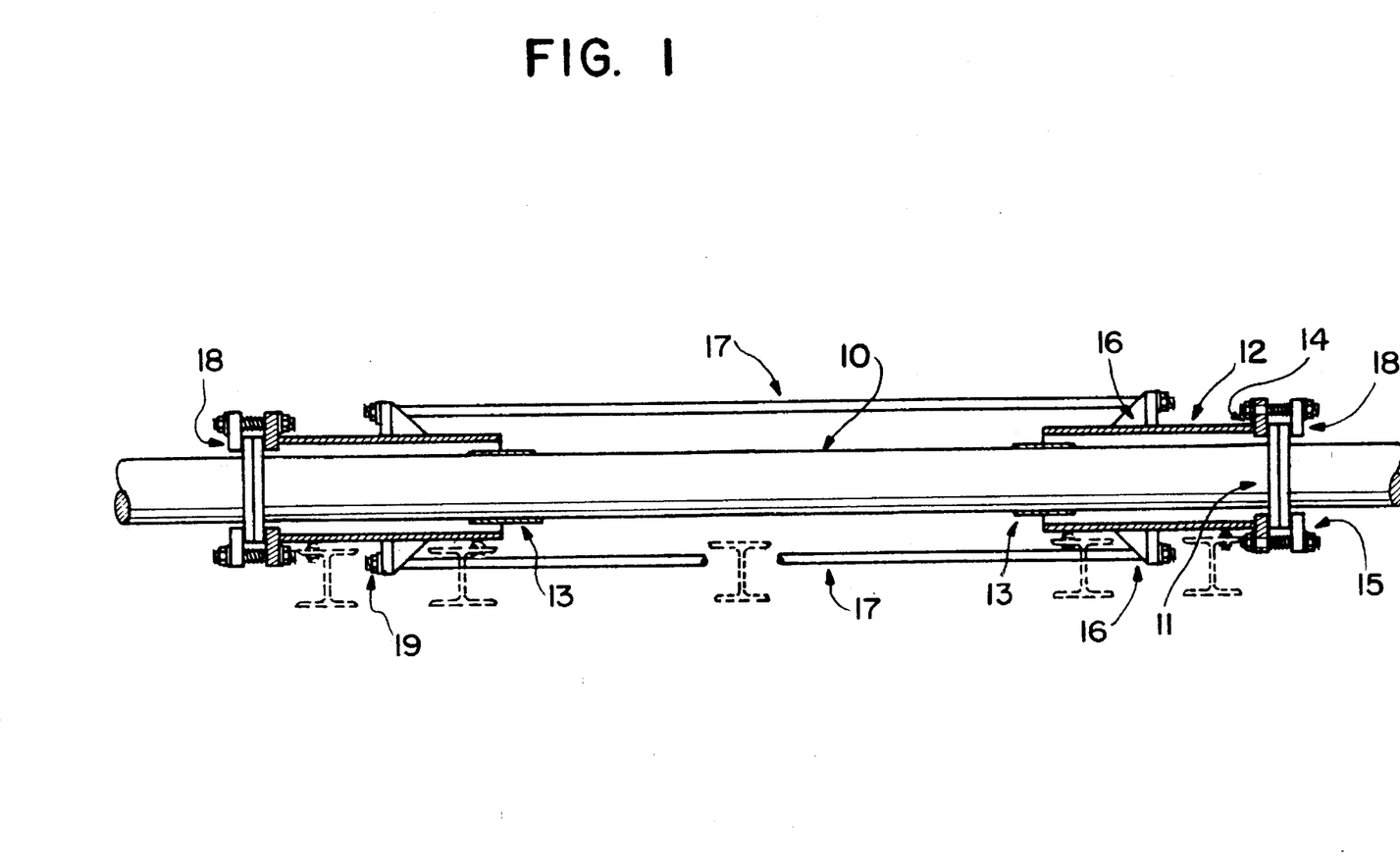
FIG. 1 is a side, perspective view of a system according to this invention.

FIG. 1 is a side view of a support system according to this invention for high density polyethylene piping, synthetic resinous piping and thermoplastic piping which is suitable for use above grade. In this embodiment, a thermoplastic pipe 10, has a flange adapter 11, commonly called a stub end, welded to the pipe 10. A metallic sleeve 12, is fitted over the pipe leaving sufficient space for a wear pad 13, inserted between the pipe 10, and the sleeve 12. A backing flange 14, is welded to the sleeve and butts against the flange adapter 11. The backing flange 14 is attached to another adjacent backing flange with the backing flanges spaced apart from each other by the stub-ends upon tightening the bolts 15 therethrough or any other means used in the art. The adjacent backing flange 18 may be connected to an adjacent unit or a standard steel backing flange 18. At least two circumferentially spaced lugs 16 are welded into the sleeve 12. Each lug 16 has an interconnecting member 17 which connects it with an identical lug on a sleeve system on the opposite end of the pipe 10. The interconnecting member 17 is equipped with an attaching means 19 for attaching the interconnecting member 17 to the lug.

Figure 2:
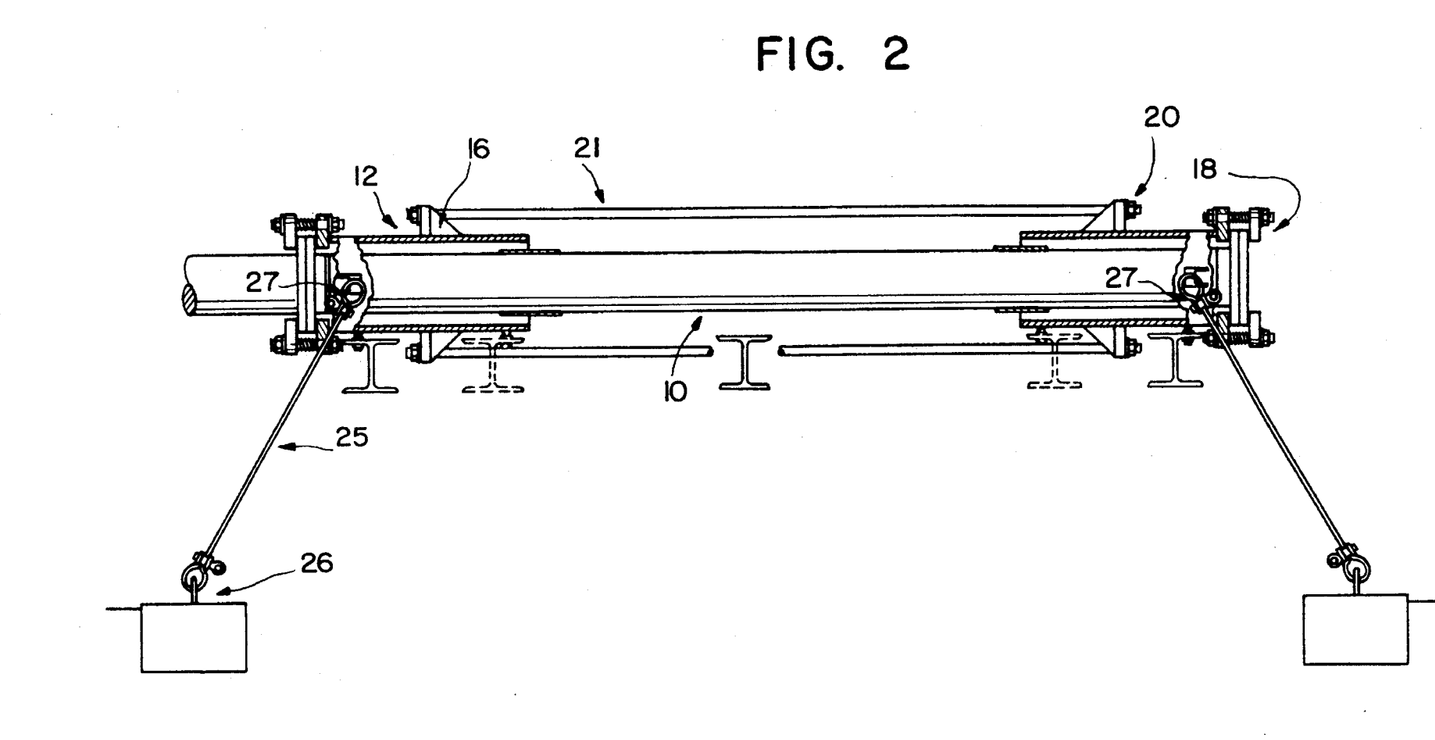
FIG. 2 is a side, perspective view of a system according to this invention.

The embodiment shown in FIG. 2 is similar to that in FIG. 1 but the interconnecting member is replaced with similar tension connectors. Each lug 16 has a tie rod or cable 21 which connects it with an identical lug on a sleeve system on the opposite end of the pipe 10. The rod or cable 21 is equipped with a means for tightening 20 the cable or rod 21. The tightened rod or cable 21 keeps the thermoplastic pipe 10 in longitudinal compression and absorbs thrust created by thermal expansion of the pipe. While the tension rods or cables inhibit pipe movement due to thermal expansion, anchors used at various intervals and preferably at straight run terminations control movement due to thermal contraction of the pipe. Anchor cables 25 and anchor points 26 are attached to the metallic sleeve 12 by use of a lug 27. The anchor cables 25 may be attached to anchor points 26 such as grade or other structures which can withstand the load created by the contracting pipe 10. The anchor points 26 may also be provided by a pipe rack if the rack is capable of withstanding the forces exerted by the system. In a given length of pipe incorporating one or more sections of pipe utilizing this invention, anchor points 26 may be used for any given length. The distance between anchor points will be determined by good engineering practices and convenience. In one embodiment for a section of pipe 36 inches in diameter and 640 feet long, two anchor points were used each, one at each end of the run. It can be seen that in certain embodiments in which rigid members are used to support the pipe instead of cables, anchor points are usually not required since rigid members resist both thermal expansion and contraction of the pipe 10.

Figure 3:
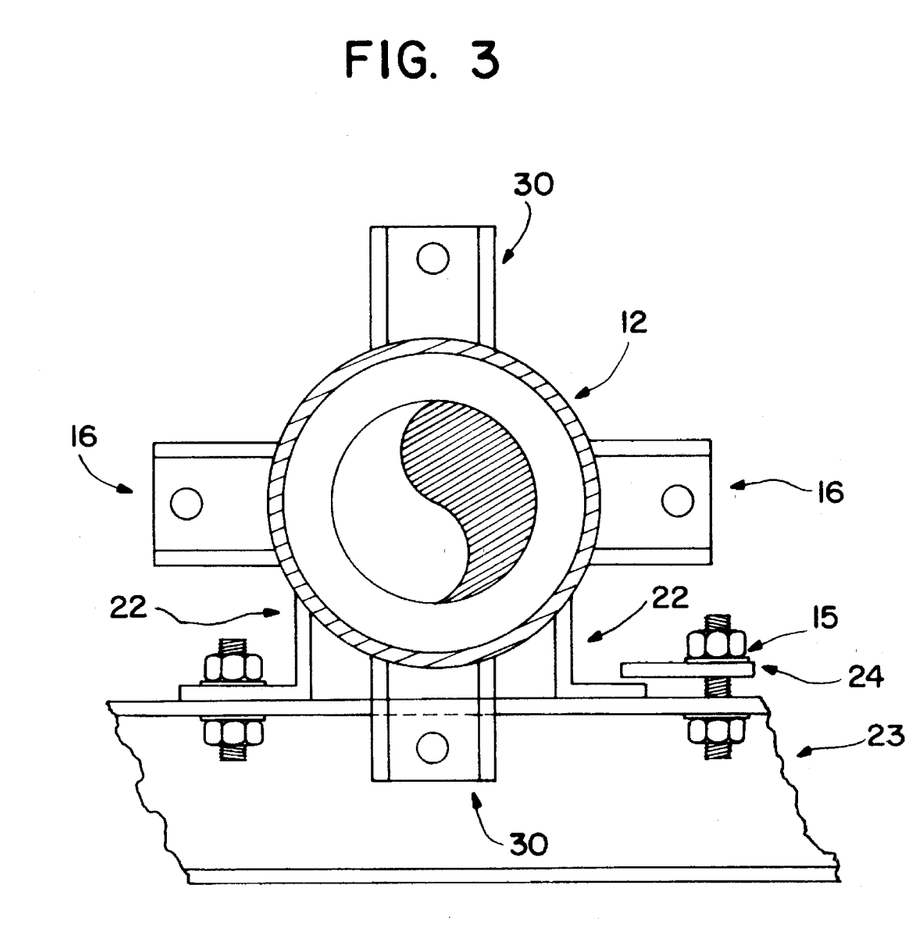
FIG. 3 is a cross-sectional view of a sleeve portion according to this invention.

FIG. 3 presents a cross-sectional end view of a sleeve portion of the invention. At least two circumferentially spaced lugs 16 are welded into the sleeve 12. Each lug has a tie rod, cable or rigid member which connects it with a (generally identical) lug on a sleeve system on the opposite end of the pipe. When several pipe sections are used in conjunction with each other at least two additional lugs 30 are used in conjunction with cable, tie rods or rigid members which are used as shown in FIGS. 1 and 2. At least two shoes 22 are connected to the sleeve 12. A bolt 15 may be used to connect these shoes 22 to a structural support 23, such as an above grade pipe rack. Bolting of the shoes 22 to a support is not required to carry out the objects of this invention. One preferred method, includes connecting the shoes 22 to the structural support 23 by use of a guide 24 which is bolted to the structure. Use of guides 24 allows quick installation or removal of the support system without lining up bolt holes. The use of a guide prevents thermally induced loads from being transmitted to the underlying support.

Figure 4:
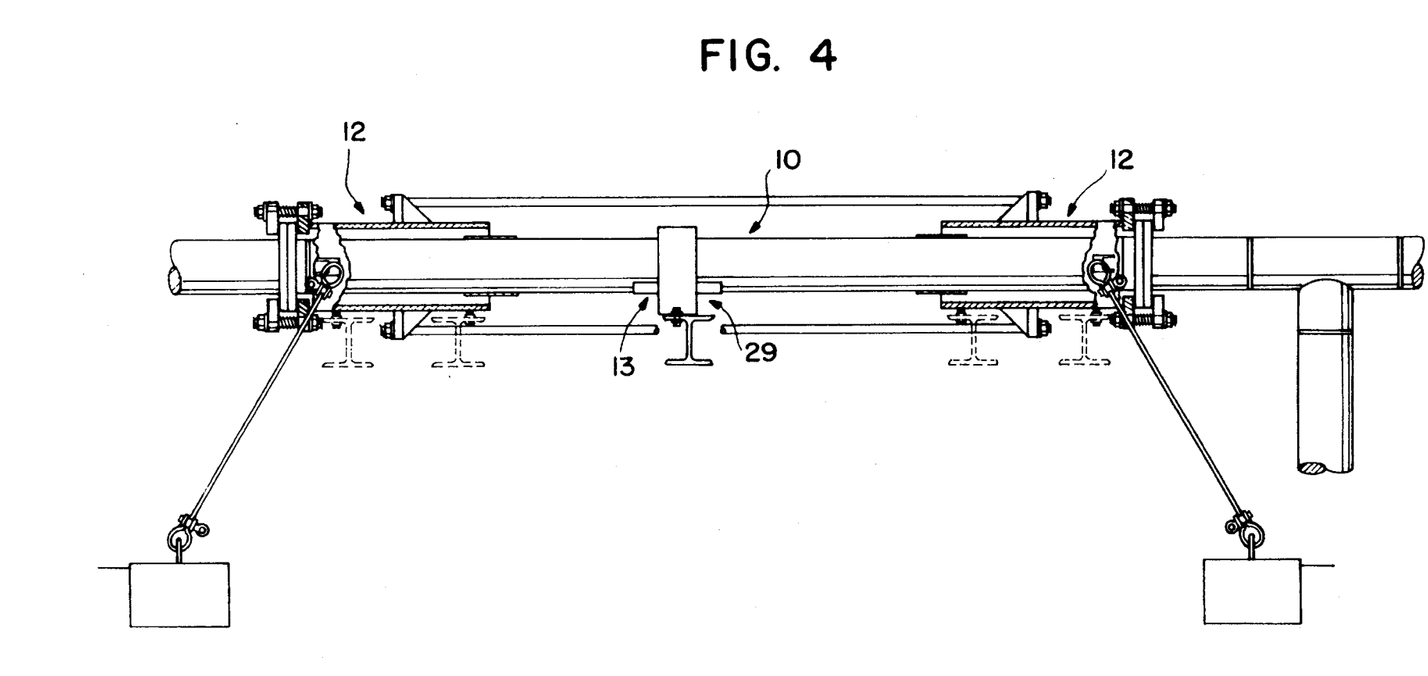
FIG. 4 is a expanded side view of a system with a support ring.

Another preferred embodiment uses support rings 29, as shown in FIG 4. The distance between the rings 29 and the sleeves 12 will be determined by good engineering practices and convenience. The rings 29 have sufficient space for a wear pad 13 to be inserted between the pipe 10 and the ring 29. Wear pads are preferably made of steel or a synthetic resinous material. Preferably the wear pads are made a thermoplastic or more preferably from HDPE. Lubrication of the wear pads is not required but may be use where dictated by good engineering practices.

Figure 5:
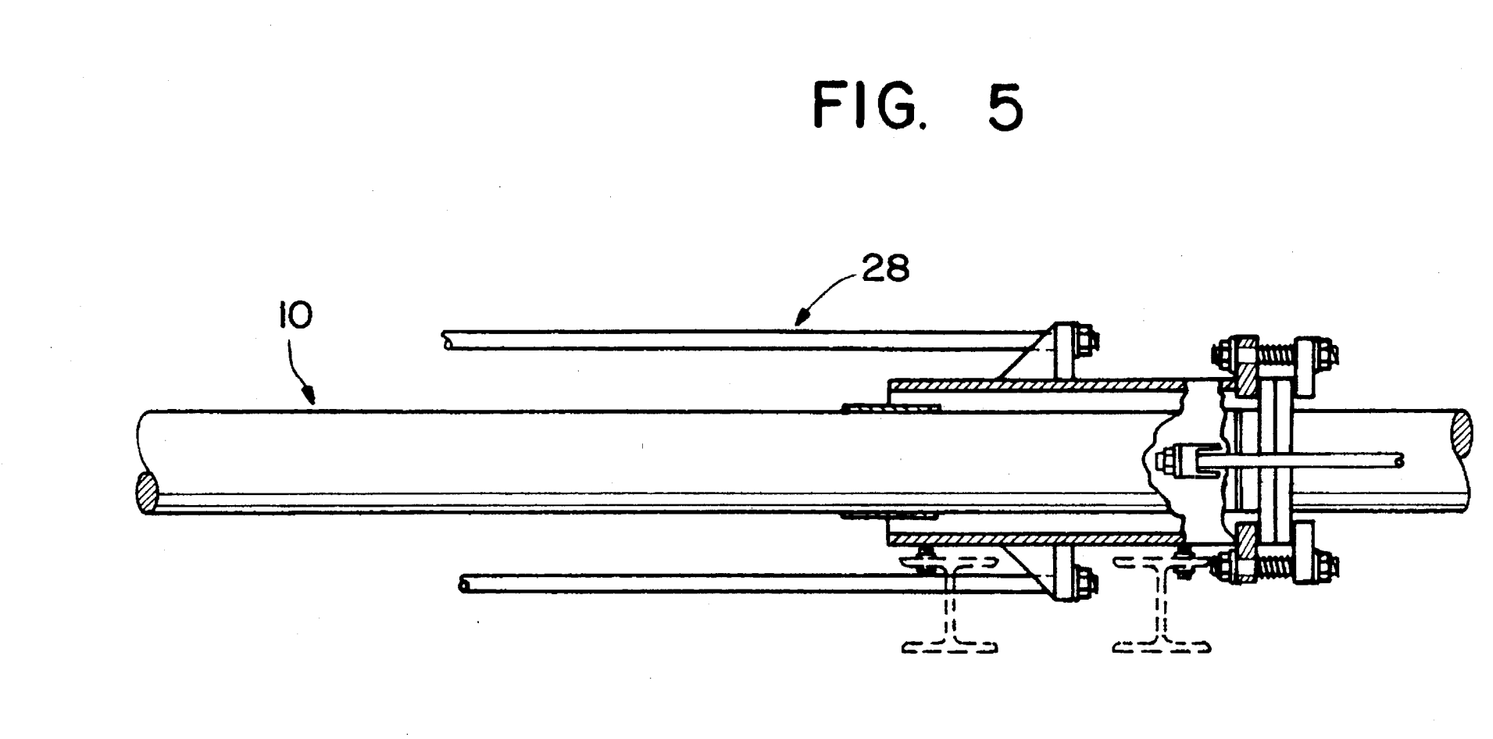
FIG. 5 is a expanded side view of the clamp portion of the invention with tension members.

FIG. 5 is a side view of a clamp portion of an embodiment of the invention with rigid members 28 instead of tension members such as rod or cable 21 as shown in FIG. 2. The rigid members may be any structural material that resists thermal contraction and expansion such as metal pipe, metallic wide flanges or other materials having similar properties. The forces created by both the thermal expansion and contraction of the pipe 10 in the system of FIG. 5 are absorbed in substantial part by the rigid members 28 unlike the tension system of FIG. 2, in which the force caused by thermal expansion is absorbed in substantial part by the tie rod or cable 21 and the force caused by thermal contraction is absorbed in substantial part by the anchor cables 25 and anchors 26.

Figure 6:
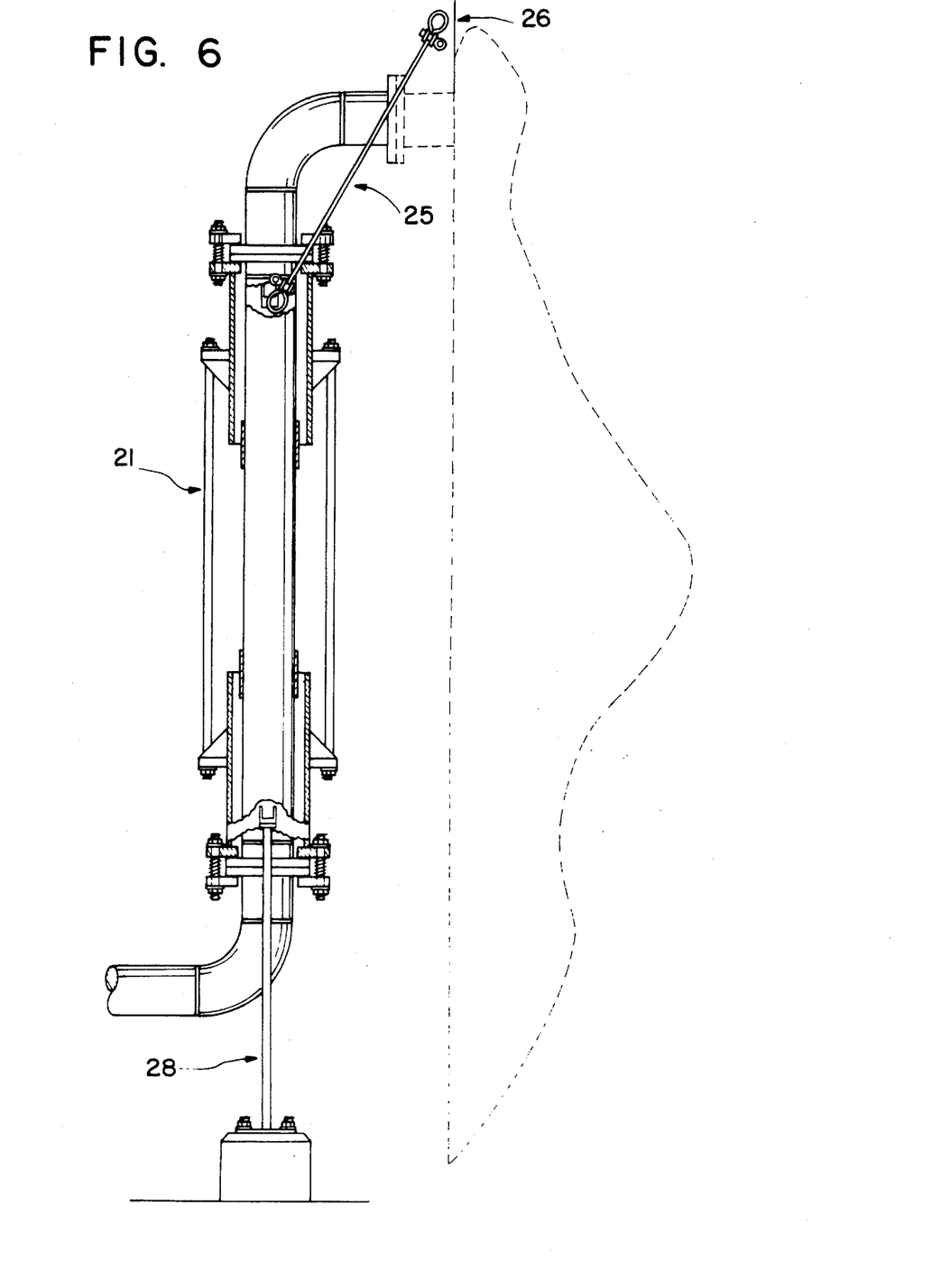
FIG. 6 is a side perspective view of a system according to the present invention with a vertical tension supposed position shown with potions of the piping connecting to a tank.

Another embodiment of this invention utilizes both tension and rigid supports. A combination of supports may be used when it is desired to relieve stress on members of the piping. For example, for vertical and horizontal piping runs connecting to a vessel such as a tank or a reactor, it is undesirable to place stress on a connection between the piping and the vessel connection. In the embodiment of this invention shown in FIG. 6, use of a rigid members 28 transfers the weight of the piping support system to grade. When using tension members such as rod or cable 21 to absorb thermal stress, the anchor cable 25 transfers forces caused by contraction of the pipe 10 to the anchor point 26 which may be a vessel wall or any convenient structure rather than to the welded joint located between the vessel and the inlet pipe.

Figure 7:
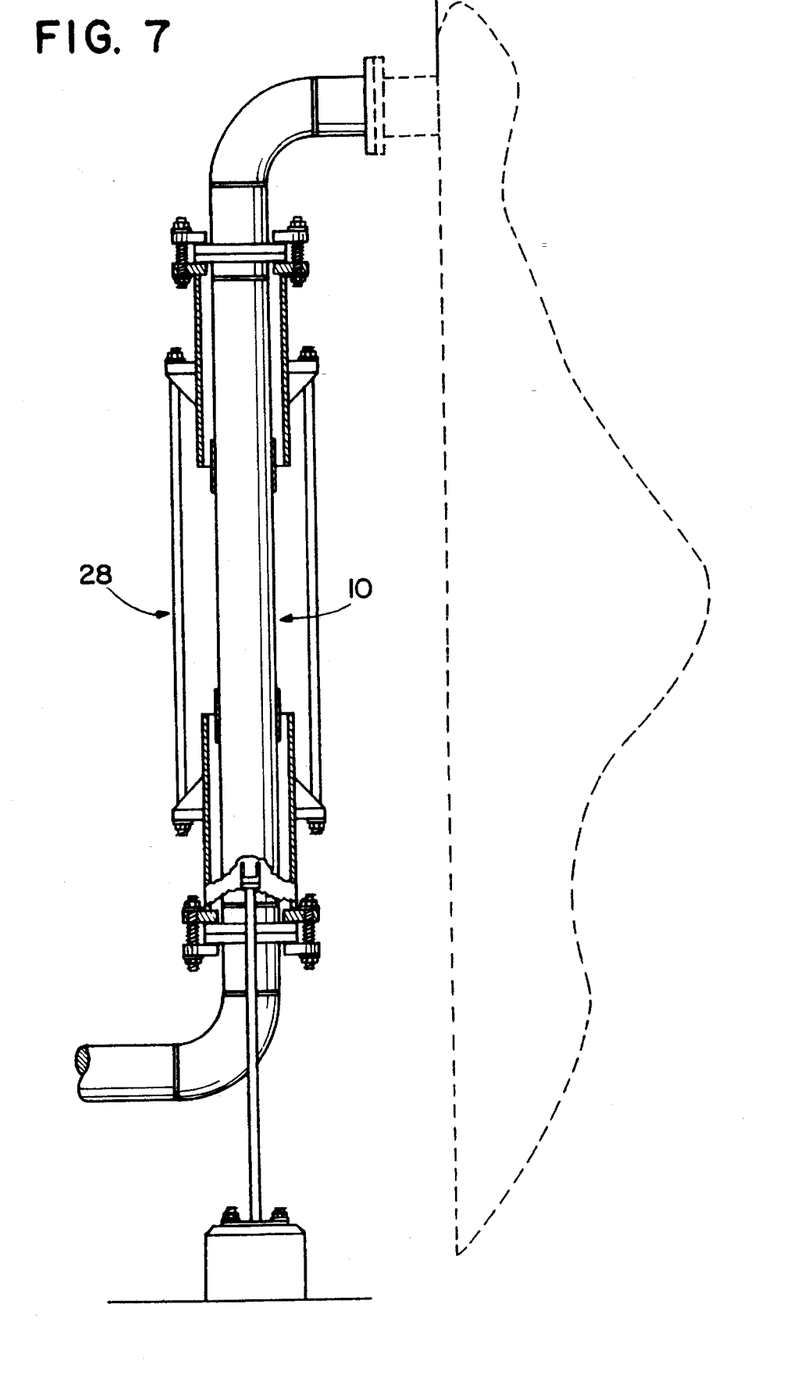
FIG. 7 is a side perspective view of a system according to the present invention with a vertical rigid supported position shown with potions of the piping connected to a tank.

In situations where low anchor loads are necessary, rigid members may be used in place of tension members as shown in the embodiment of the present invention depicted in FIG. 7. The tension cables are replaced by rigid members 28 which in substantial part absorb the forces caused by thermal contraction of the pipe 10.

Figure 8:
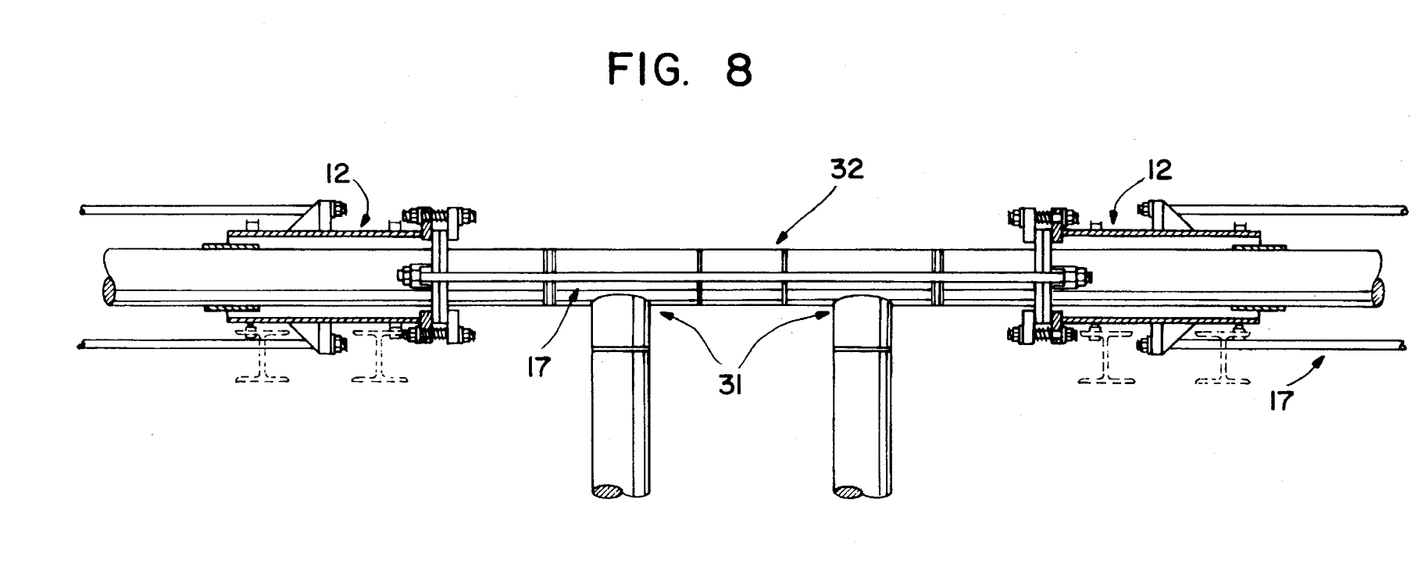
FIG. 8 is a side perspective view of a system according to the present invention with multiple fittings.

Certain embodiments of this invention may be used to restrain the movement of pipe in areas where space limitations prevent the use of metallic sleeves. An example of such a system is shown in FIG. 8 in which multiple pipes 31 tee off a short run of pipe 32 located between two sections of pipe supported by a system according to this invention. Use of, as an interconnecting member, a rigid member 28 or cable or rod connected to the adjacent metallic sleeves 12 at opposite ends of the short run, restrains the pipe from movement.

Figure 9:
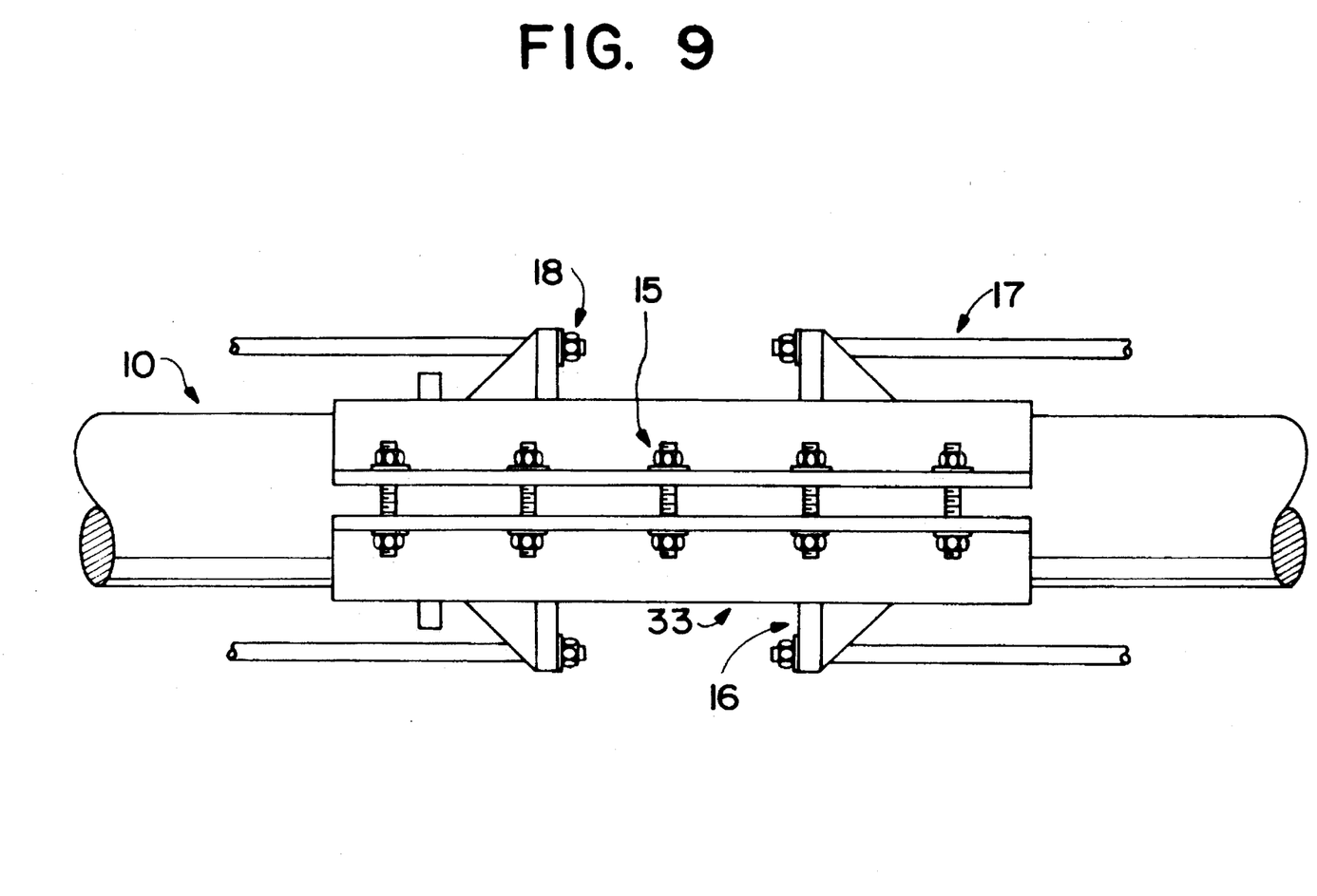
FIG. 9 is a side perspective view of a system according to this invention utilizing an alternate clamp potion.

Another embodiment of this invention uses the optional means of attaching the sleeve to the pipe as shown in FIG. 9. The sleeve may be attached at any location on the pipe with the distance between sleeves dictated by good engineering practice. A preferred embodiment would be to attached the sleeve at each end of a section of pipe. The sleeve 33 consists of two members connected by bolts 15 or any other means used in the art. At least two circumferentially spaced lugs 16 are welded into the sleeve 33. Each lug 16 has a interconnecting member 17 which connects it with an identical lug on a sleeve system on the opposite end of the pipe 10. The interconnecting member 17 is equipped with an attaching means 19 for attaching the interconnecting member 17 to the lug 16.

Figure 10:
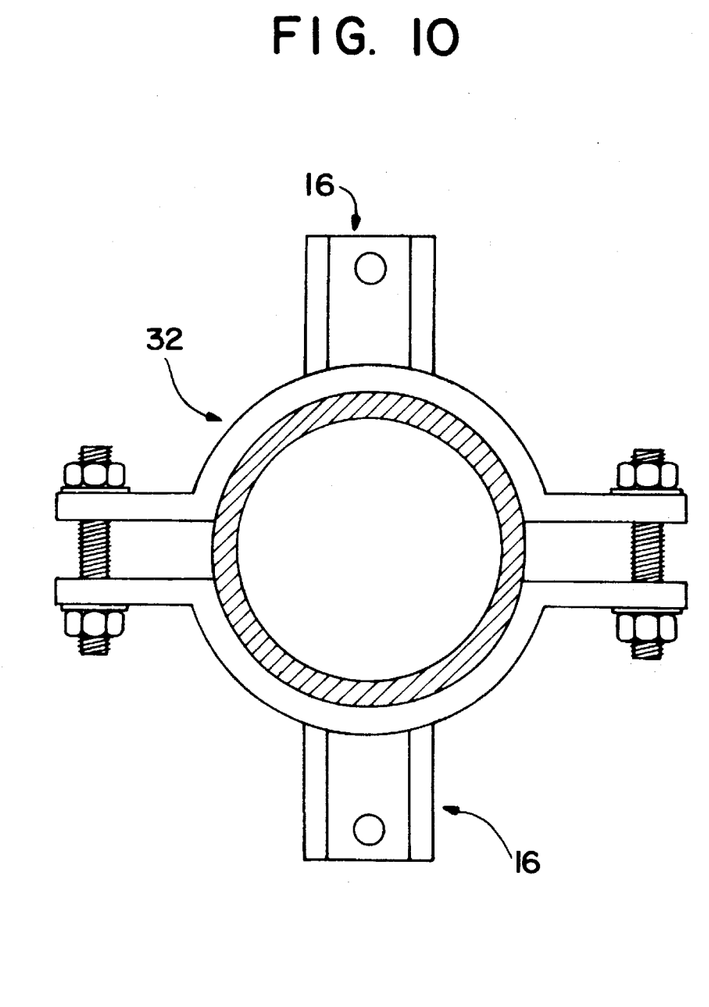
FIG. 10 is a cross-sectional view of the clamp potion according to FIG. 9.

FIG. 10 presents a cross-sectional end view of a clamp portion of FIG. 9. At least two circumferentially spaced lugs 16 are welded into the sleeve 32. Each lug has a tie rod, cable or rigid member which connects it with a (generally identical) lug on a sleeve system on the opposite end of the pipe.

What is claimed is:

1. A supported pipe assembly including (i) a plastic pipe having a first pipe end and a second pipe end, and (ii) a support system for the plastic pipe, the support system comprising a first sleeve for disposition about the first pipe end, first securement means for securing the first sleeve to the first pipe end, a second sleeve for disposition about the second pipe end, second securement means for securing the second sleeve to the second pipe end, and connection means for connecting the sleeves together exteriorly of the pipe so that longitudinal expansion of the plastic pipe is inhibited, the connection means being adjustable in tension to compress the pipe longitudinally.

2. The assembly of claim 1 wherein the pipe is precompressed longitudinally prior to or during installation.

3. The assembly of claim 1 wherein the sleeves are attached to a structural support.

4. The assembly of claim 3 wherein each sleeve is attached to said structural support with at least two shoes.

5. The assembly of claim 4 wherein the shoes are attached to said structural support with guides.

6. The assembly of claim 1 wherein the connection means comprises both a rod or cable tension member and a rigid support.

7. The assembly of claim 1 wherein said connection means are rigid supports.

8. The assembly of claim 1 wherein said pipe is in a horizontal position.

9. The assembly of claim 1 wherein the pipe is synthetic resinous material.

10. The assembly of claim 1 wherein the pipe is thermoplastic.

11. The assembly of claim 10 wherein the pipe is HDPE.

12. The assembly of claim 10 wherein the pipe is polypropylene.

13. The assembly of claim 1 wherein the pipe is disposed above the earth's surface on supports.

14. The assembly of claim 1 further comprising an anchor means connected to the support system for anchoring the support system to an anchor member.

15. The assembly of claim 14 wherein each anchor member is secured to earth.

16. The assembly of claim 14 wherein the anchor means includes at least one cable connected outside the pipe between at least one cable securement means connected to a sleeve and to at least one anchor member, each anchor member being secured to earth, so that longitudinal thermal contraction of the plastic pipe is inhibited by increased tension on the cable.

17. The assembly of claim 16 wherein the pipe is pre-compressed prior to or during installation.

18. The assembly of claim 1 further comprising a holding means connected to the support system for supporting the pipe and sleeves above a surface beneath the pipe and sleeves.

19. The assembly of claim 18 wherein the holding means is beneath each sleeve and in contact therewith.

20. The assembly of claim 19 wherein the holding means comprises a pipe rack.

21. The assembly of claim 1 wherein the connection means comprises a sleeve flange secured to and extending from each sleeve and a plurality of two or more interconnecting members secured to each sleeve flange and extending therebetween, the interconnecting members spaced apart equally about a circumference of the pipe and adjustable in tension to longitudinally compress the pipe, anchor means connected to the sleeves and to the earth for anchoring the support system to control contraction of the pipe, holding means on which the support system rests for holding the support system above the earth.

22. The assembly of claim 1 wherein the plastic pipe is a portion of a pipeline that comprises the pipe with its two ends, at least one of which is joined to an end of an additional pipe that also has two ends.

23. The assembly of claim 22 wherein the pipeline includes, within the pipe, a material to be transported.

24. The assembly of claim 23 wherein the material to be transported includes at least one liquid, at least one solid, or a mixture of at least one liquid and at least one solid.

25. The assembly of claim 1 wherein said pipe is in a vertical position.

26. The assembly of claim 1 wherein said pipe includes a horizontal run and a vertical run, and one end of said pipe is connected to a pipe segment welded to the wall of a vessel.

27. The assembly of claim 1 wherein the first sleeve has secured to and extending therefrom at least two circumferentially spaced lugs and the support system further comprises at least two circumferentially spaced lugs secured to and extending from the second sleeve, each of at least two of the lugs on the second sleeve being aligned with a corresponding lug on the first sleeve.

28. The assembly of claim 27 wherein the connection means also comprises at least two interconnecting members, one interconnecting member being secured to and extending between each lug of the at least two circumferentially spaced lugs on the first sleeve and the aligned lug on the second sleeve.

29. A supported pipe assembly including (i) a plastic pipe having a first pipe end and a second pipe end, and (ii) a support system for the plastic pipe, the support system comprising a first sleeve for disposition about the first pipe end, first securement means for securing the first sleeve to the first pipe end, a second sleeve for disposition about the second pipe end, second securement means for securing the second sleeve to the second pipe end, each of the sleeves having a distal end adjacent the respective end of the plastic pipe about which the respective sleeve is positioned and a proximate end closer to the other sleeve than is the distal end of the sleeve, at least one wear pad disposed between the proximate end of each sleeve and the plastic pipe at the proximate end of the sleeve, and connection means for connecting the sleeves together exteriorly of the pipe so that longitudinal expansion of the plastic pipe is inhibited.

30. The assembly of claim 29 wherein the wear pads are made from a thermoplastic material or steel.

31. A supported pipe assembly including (i) a plastic pipe having a first pipe end and a second pipe end, and (ii) a support system for the plastic pipe, the support system comprising a first sleeve for disposition about the first pipe end, first securement means for securing the first sleeve to the first pipe end, a second sleeve for disposition about the second pipe end, second securement means for securing the second sleeve to the second pipe end, at least one lubricated wear pad disposed between each sleeve and its corresponding pipe, and connection means for connecting the sleeves together exteriorly of the pipe so that longitudinal expansion of the plastic pipe is inhibited.

32. A supported pipe assembly including (i) a plastic pipe having a first pipe end and a second pipe end and each pipe end having a pipe flange adapter, and (ii) a support system for the plastic pipe, the support system comprising:

a first sleeve for disposition about the first pipe end, first securement means for securing the first sleeve to the corresponding pipe flange adapter on the first pipe end, a second sleeve for disposition about the second pipe end, second securement means for securing the second sleeve to the corresponding pipe flange adapter on the second pipe end, and connection means for connecting the sleeves together exteriorly of the pipe.

33. A supported pipe assembly including (i) a plastic pipe having a first pipe end and a second pipe end and each pipe end having a pipe flange adapter, and (ii) a support system for the plastic pipe, the support system comprising:

a first sleeve having a pipe flange for disposition about the first pipe end, first securement means for securing the first sleeve flange to the corresponding flange adapter on the first pipe end, a second sleeve having a pipe flange for disposition about the second pipe end, second securement means for securing the second sleeve flange to the corresponding flange adapter on the second pipe end, and connection means for connecting the sleeves together exteriorly of the pipe.

34. The assembly of claim 33 further wherein the connection means comprises a plurality of interconnecting members between and connected to the first sleeve flange and the second sleeve flange.

35. The assembly of claim 33 wherein the interconnecting members are spaced apart equally about a circumference of the pipe.

36. A supported pipe assembly including (i) a straight run of plastic pipe having a first pipe end and a second pipe end, the straight run including a first straight plastic pipe segment having first and second ends and a flange adapter at each end of the segment, a final straight plastic pipe segment at the opposite end of the straight run, the final straight plastic pipe segment having first and second ends and a flange adapter at each end of the segment, and at least one intermediate straight plastic pipe segment, each intermediate segment having a first end and a second end and a flange adapter at each end, the straight run commencing with the flange adapter at the first end of the first segment and terminating with the flange adapter at the second end of the final segment, the flange adapter at the second end of the first segment abutting, being joined to, and forming a first intermediate pipe flange joint with, the first flange adapter of the first intermediate segment, and the second flange adapter of the last intermediate segment abutting, being joined to, and forming a second intermediate pipe flange joint with, the flange adapter of the first end of the final segment, and (ii) a support system for the straight run of plastic pipe, the support system comprising a first sleeve for disposition about the first pipe end, first securement means for securing the first sleeve to the first pipe end, a second sleeve for disposition about the second pipe end, second securement means for securing the second sleeve to the second pipe end, at least one intermediate sleeve for disposition about an end of a pipe segment at each intermediate pipe flange joint;

a securement means for securing each intermediate sleeve to the respective pipe segment end at the respective intermediate joint; and connection means for connecting each sleeve to each adjacent sleeve exteriorly of the plastic pipe, wherein the first sleeve and first securement means are secured at the first end of the first segment, the second sleeve and second securement means are secured at the second end of the final segment, and each sleeve is connected to each adjacent sleeve exteriorly of the plastic pipe so that longitudinal expansion of the plastic pipe is inhibited.

37. The assembly of claim 36 wherein at least one intermediate segment includes a tee connection to another pipe.

38. The assembly of claim 36 wherein each straight plastic pipe segment comprises carbon black filled high density polyethylene.

39. The assembly of claim 38 wherein each pipe segment has a diameter of at least 12 inches.

40. A supported assembly including (i) a straight run of plastic pipe having a first pipe end and a second pipe end, the straight run including a first straight plastic pipe segment having first and second ends and a flange adapter at each end of the segment, a final straight plastic pipe segment at the opposite end of the straight run, the final straight plastic pipe segment having first and second ends and a flange adapter at each end of the segment, and at least one intermediate straight plastic pipe segment, each intermediate segment having a first end and a second end and a flange adapter at each end, the straight run commencing with the flange adapter at the first end of the first segment and terminating with the flange adapter at the second end of the final segment, the flange adapter at the second end of the first segment abutting, being joined to, and forming a first intermediate pipe flange joint with, the first flange adapter of the first intermediate segment, and the second flange adapter of the last intermediate segment abutting, being joined to, and forming a second intermediate pipe flange joint with, the flange adapter of the first end of the final segment, and (ii) a support system for the straight run of plastic pipe, the support system comprising a first sleeve for disposition about the first pipe end, first securement means for securing the first sleeve to the first pipe end, a second sleeve for disposition about the second pipe end, second securement means for securing the second sleeve to the second pipe end, at least one intermediate sleeve for disposition about an end of a pipe segment at each intermediate pipe flange joint;

a securement means for securing each intermediate sleeve to the respective pipe segment end at the respective intermediate joint; and connection means for connecting each sleeve to each adjacent sleeve exteriorly of the plastic pipe, wherein the first sleeve and first securement means are secured at the first end of the first segment, the second sleeve and second securement means are secured at the second end of the final segment, and each sleeve is connected to each adjacent sleeve exteriorly of the plastic pipe so that longitudinal expansion of the plastic pipe is inhibited, and wherein each pipe segment flange adapter includes a proximate face, and a distal face engaging the distal face of the flange adapter of an adjoining segment of pipe comprising a joint, each sleeve includes a backing flange welded to one end of the sleeve, the backing flange of each sleeve engages a proximate face of one of the flange adapters of the pipe segment about which the respective sleeve is positioned, each backing flange welded to a sleeve being bolted to an adjacent backing flange positioned against the proximate face of the flange adapter of the adjacent segment of pipe to form the respective joint, the bolts securing each sleeve backing flange to the respective adjacent backing flange being aligned parallel to the longitudinal axis of the pipe.

* * * * *